(12) United States Patent
Hwang et al.

(10) Patent No.: US 9,306,654 B2
(45) Date of Patent: Apr. 5, 2016

(54) OPPORTUNISTIC ACTIVE INTERFERENCE CANCELLATION USING RX DIVERSITY ANTENNA

(71) Applicant: QUALCOMM Incorporated, San Diego, CA (US)

(72) Inventors: Insoo Hwang, San Diego, CA (US); Bongyong Song, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/152,586

(22) Filed: Jan. 10, 2014

(65) Prior Publication Data

US 2015/0200721 A1    Jul. 16, 2015

(51) Int. Cl.
| | | |
|---|---|---|
| *H04B 1/02* | (2006.01) | |
| *H04B 7/02* | (2006.01) | |
| *H03C 7/02* | (2006.01) | |
| *H04B 7/08* | (2006.01) | |
| *H04B 1/10* | (2006.01) | |
| *H04B 1/12* | (2006.01) | |

(52) U.S. Cl.
CPC ............... *H04B 7/0814* (2013.01); *H04B 1/02* (2013.01); *H04B 1/1027* (2013.01); *H04B 1/126* (2013.01); *H04B 7/0877* (2013.01)

(58) Field of Classification Search
CPC ........ H04B 1/1036; H04B 1/525; H04B 1/10; H04B 1/006; H04W 88/06; H03H 2007/013
USPC .......... 455/101, 63.1, 67.13, 295, 296, 278.1, 455/67.11, 73, 78, 552.1, 130, 132–135, 455/137, 277.1, 277.2
See application file for complete search history.

(56) References Cited

U.S. PATENT DOCUMENTS

| | | | |
|---|---|---|---|
| 6,128,355 A | 10/2000 | Backman et al. | |
| 6,539,204 B1 | 3/2003 | Marsh et al. | |
| 6,678,508 B1 * | 1/2004 | Koilpillai et al. | 455/137 |

(Continued)

FOREIGN PATENT DOCUMENTS

EP        1239598 A2    9/2002

OTHER PUBLICATIONS

Partial International Search Report—PCT/US2015/010366—ISA/EPO—Apr. 21, 2015.

(Continued)

*Primary Examiner* — Pablo Tran
(74) *Attorney, Agent, or Firm* — Foley & Lardner LLP (57) ABSTRACT

A method of performing interference cancellation (IC) in a wireless communication device having a receiver comprising at least a primary receiver chain and a diversity receiver chain includes determining an interference level of a transmitted signal on the receiver; determining whether the interference level is within a predetermined range; selecting a first mode of operation if the interference level is within a predetermined range; and selecting a second mode of operation if the interference level is not within the predetermined range. The first mode includes receiving, at the primary receiver chain, a first signal corresponding to the transmitted signal; receiving, at the diversity receiver chain, a second signal corresponding to the transmitted signal for providing to an IC circuit; generating, at the IC circuit, an output signal based on the second signal; and generating a cancellation signal based on the output signal and the first signal.

23 Claims, 8 Drawing Sheets

(56) References Cited

U.S. PATENT DOCUMENTS

| | | | |
|---|---|---|---|
| 6,816,541 | B1 | 11/2004 | Schmidl |
| 7,012,978 | B2* | 3/2006 | Talwar .......................... 375/346 |
| 7,092,352 | B2 | 8/2006 | Shattil |
| 7,809,096 | B2 | 10/2010 | Molev-Shteiman et al. |
| 8,135,349 | B2 | 3/2012 | Hwang et al. |
| 8,159,967 | B2 | 4/2012 | Cho et al. |
| 8,199,855 | B2 | 6/2012 | Collier et al. |
| 8,208,364 | B2 | 6/2012 | Walton et al. |
| 8,488,499 | B2* | 7/2013 | Frigo et al. .................... 370/310 |
| 8,521,237 | B2 | 8/2013 | Mohseni et al. |
| 8,824,967 | B2* | 9/2014 | Marra et al. ................. 455/63.1 |
| 8,843,081 | B2* | 9/2014 | Sahota .......................... 455/75 |
| 8,886,149 | B2* | 11/2014 | Haub et al. ................. 455/245.2 |
| 9,002,309 | B2* | 4/2015 | Sahota et al. ................. 455/266 |
| 2002/0155812 | A1* | 10/2002 | Takada ............................ 455/63 |
| 2006/0233224 | A1* | 10/2006 | Lotter et al. .................. 375/148 |
| 2007/0110135 | A1* | 5/2007 | Guess et al. .................. 375/148 |
| 2007/0183483 | A1* | 8/2007 | Narayan et al. ............... 375/148 |
| 2009/0023403 | A1 | 1/2009 | LaBerge et al. |
| 2009/0141776 | A1* | 6/2009 | Roberts et al. ............... 375/148 |
| 2009/0143041 | A1 | 6/2009 | Rofougaran |
| 2010/0111141 | A1* | 5/2010 | Currivan et al. .............. 375/144 |
| 2010/0150279 | A1* | 6/2010 | Arar ............................... 375/340 |
| 2010/0177857 | A1* | 7/2010 | Huttunen et al. ............. 375/350 |
| 2010/0208774 | A1* | 8/2010 | Guess et al. .................. 375/148 |
| 2011/0044380 | A1* | 2/2011 | Marra et al. ................... 375/219 |
| 2012/0230176 | A1* | 9/2012 | Komninakis et al. ......... 370/201 |
| 2013/0052964 | A1 | 2/2013 | Husted |
| 2015/0017989 | A1* | 1/2015 | Brisebois ....................... 455/436 |

OTHER PUBLICATIONS

International Search Report and Written Opinion—PCT/US2015/010366—ISA/EPO—Jul. 7, 2015.

* cited by examiner

OPPORTUNISTIC ACTIVE INTERFERENCE CANCELLATION USING RX DIVERSITY ANTENNA

BACKGROUND

1. Field

The disclosure relates generally to the field of interference cancellation systems and methods, and, in particular, to systems and methods for selectively cancelling interference using a diversity receiver chain.

2. Background

Advanced wireless devices have multiple radios (e.g., WWAN, WLAN, WPAN, GPS/GLONASS, etc.) that operating on the same, adjacent, or harmonic/sub-harmonic frequencies. Various combinations of radios cause co-existence issues due to the relative frequencies. In particular, when one radio is actively transmitting at or close to the same frequency and at a same time that another radio is receiving, the transmitting radio can cause interference to the receiving radio. For example, same band interference may occur between Bluetooth (WPAN) and 2.4 GHz WiFi (WLAN); adjacent band interference between WLAN and LTE band 7, 40, 41; harmonic/sub-harmonic interference may occur between 5.7 GHz ISM and 1.9 GHz PCS; and an intermodulation issue may occur between 7xx MHz and a GPS receiver).

The interference cancellation requirements increase due to increasing level of interference from both in-device and inter-device radios. This can result in severe degradation of the receiver performance. There are many proposed interference mitigation techniques in time, frequency, spatial, software, or power domains. However, most of these techniques relate to interference avoidance/coordination that do not fully enable concurrent transmission and reception. This results in the degradation of spectral efficiency.

Active interference cancellation (AIC) cancels interference between a transmitter radio and a receiver radio by matching gain and phase of a wireless coupling path signal (hc) and in a wired AIC path.

The AIC can happen in RF (radio frequency), BB (baseband), or both RF/BB. AIC in BB only shows limited cancellation performance because the coupling path signal is much stronger than the desired signal strength (i.e., interference level is much higher than desired signal level), easily resulting in saturation of RF components, such as LNA (low-noise amplifier) and ADC (analog-to-digital converter), the limiting the applicability of the BB technique.

AIC in RF provides better cancellation performance. In prior art RF AIC techniques, the transmit signal is coupled using a coupling device and then subtracted at the receiver after adjusting the gain equal to the signal received from the receiver. This approach has some limitations. First, it is hard to match the group delay between the AIC path and the coupling path. Second, transmitter noise may fall into the receiver band, causing significant increase in the noise figure after the LNA. Third, the AIC cannot be turned off regardless of the strength of the interference. Fourth, a small but non-negligible coupler is needed in the transmit path to provide a reference signal to the AIC path.

SUMMARY

A method of performing interference cancellation (IC) (such as active interference cancellation (AIC)) in a wireless communication device having a receiver comprising at least a primary receiver chain and a diversity receiver chain includes (but is not limited to) determining an interference level of a transmitted signal on the receiver; determining whether the interference level is within a predetermined range; selecting a first mode of operation if the interference level is within a predetermined range; and selecting a second mode of operation if the interference level is not within the predetermined range.

The first mode includes receiving, at the primary receiver chain, a first signal corresponding to the transmitted signal; receiving, at the diversity receiver chain, a second signal corresponding to the transmitted signal for providing to an IC circuit; generating, at the IC circuit, an output signal based on the second signal; and generating a cancellation signal based on the output signal and the first signal. The second mode includes receiving, at the primary receiver chain, a first signal corresponding to the transmitted signal; processing, via the primary receiver chain, the first signal; receiving, at the diversity receiver chain, a second signal corresponding to the transmitted signal; and processing, via the diversity receiver chain, the second signal.

An apparatus for performing interference cancellation (IC) in a wireless communication device having a receiver comprising at least a primary receiver chain and a diversity receiver chain includes a processor and an IC circuit. The processor is configured to determine an interference level of a transmitted signal on the receiver. The processor is configured to determine whether the interference level is within a predetermined range. The processor is configured to select a first mode of operation if the interference level is within a predetermined range. The processor is configured to select a second mode of operation if the interference level is not within the predetermined range. In the first mode of the operation, the IC circuit is configured to generate an output signal based on a second signal received at the diversity receiver chain, the second signal corresponding to the transmitted signal; and the IC is configured to generate a cancellation signal based on the output signal and a first signal received at the primary receiver chain, the first signal corresponding to the transmitted signal.

A method of performing interference cancellation (IC) in a wireless communication device having a receiver comprising at least a primary receiver chain and a diversity receiver chain includes, but is not limited to any one or combination of determining an interference level of a transmitted signal on the receiver; determining whether the interference level is within a predetermined range; selecting one of the primary receiver chain and the diversity receiver chain based on the interference level of each; selecting a first mode of operation if the interference level is within a predetermined range; and selecting a second mode of operation if the interference level is not within the predetermined range. The first mode includes receiving, at the selected receiver chain, a first signal corresponding to the transmitted signal; receiving, at the other receiver chain, a second signal corresponding to the transmitted signal for providing to an IC circuit; generating, at the IC circuit, an output signal based on the second signal; and generating a cancellation signal based on the output signal and the first signal. The second mode includes receiving, at the selected receiver chain, a first signal corresponding to the transmitted signal; processing, via the selected receiver chain, the first signal; receiving, at the other receiver chain, a second signal corresponding to the transmitted signal; and processing, via the other receiver chain, the second signal.

DETAILED DESCRIPTION

In a wireless communication device having a receiver comprising at least a primary receiver chain and a diversity receiver chain, the diversity receiver chain can be selectively used as either an interference cancellation path or a diversity path, based on whether an interference level (e.g., signal-to-interference (SIR) and/or interference-to-noise (INR) level) is within a predetermined range. In particular, a system may use the diversity receiver chain as a diversity path by default (second mode) and when interference within a predetermined range is detected (e.g., if measured SIR is lower than possible diversity path gain plus some offset), the system may switch the diversity receiver chain to an interference cancellation (IC) path for performing interference cancellation.

For instance, a method of performing interference cancellation may include determining an interference level of a transmitted signal on the receiver; determining whether the interference level is within a predetermined range; selecting a first mode of operation if the interference level is within a predetermined range; and selecting a second mode of operation if the interference level is not within the predetermined range. The first mode may include receiving, at the primary receiver chain, a first signal corresponding to the transmitted signal; receiving, at the diversity receiver chain, a second signal corresponding to the transmitted signal for providing to an IC circuit (e.g., by selecting the diversity receiver chain as the IC path); generating, at the IC circuit, an output signal based on the second signal; and generating a cancellation signal based on the output signal and the first signal. The second mode may include receiving, at the primary receiver chain, a first signal corresponding to the transmitting signal; and receiving, at the diversity receiver chain, a second signal corresponding to the transmitting signal (e.g., by selecting the diversity receiver chain as a diversity path).

Figure 1:
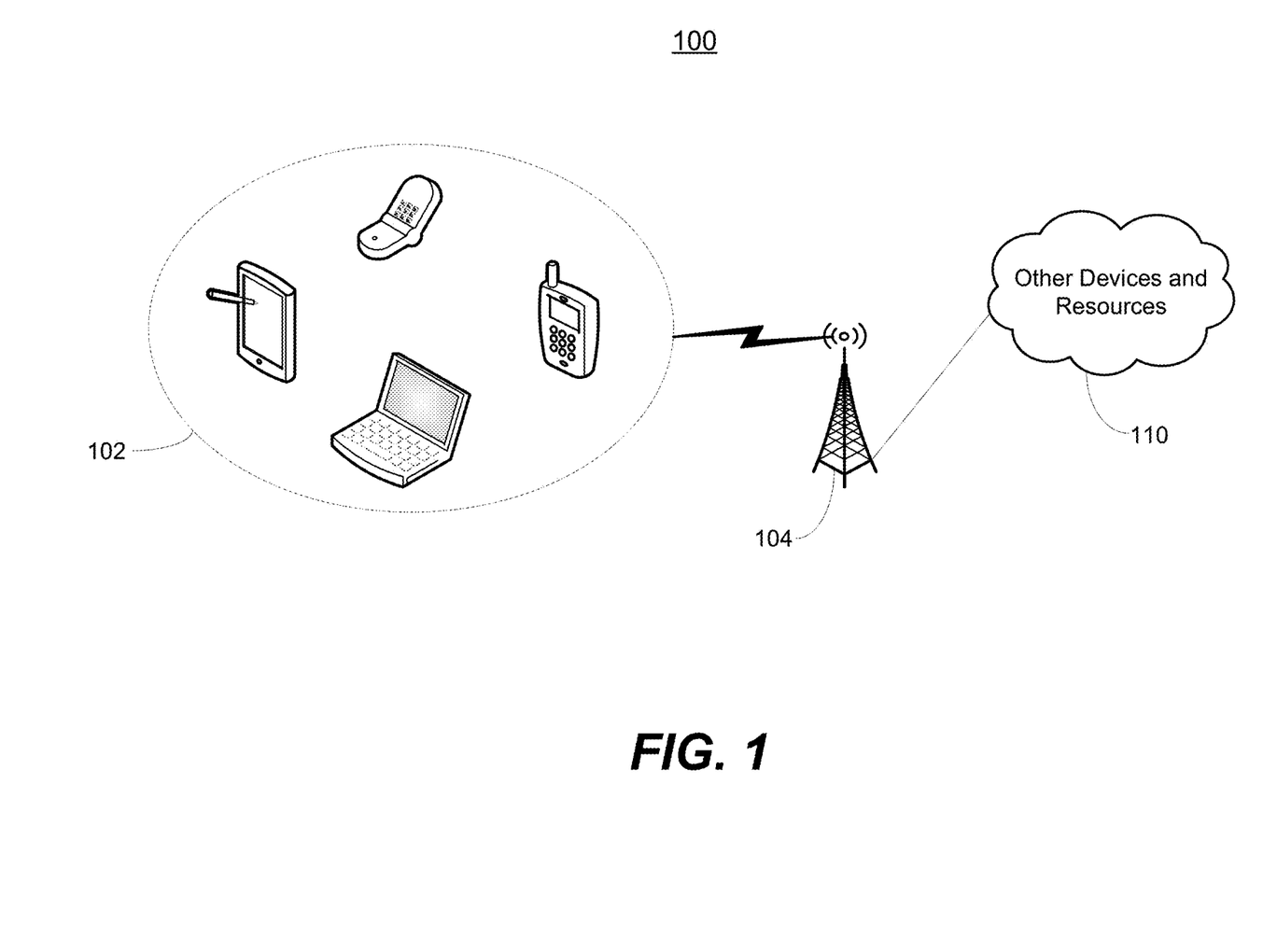
FIG. 1 is a block diagram illustrating an environment that includes a device according to various embodiments of the disclosure.

FIG. 1 is a block diagram illustrating an environment 100 that includes a device 102. The environment 100 may be representative of any system(s) or a portion thereof that may include at least one device 102 enabled to transmit and/or receive wireless signals to/from at least one wireless system 104. The device 102 may include, for example, a mobile device or a device that while movable is primarily intended to remain stationary. The device 102 may also include stationary devices (e.g., desktop computer) enabled to transmit and/or receive wireless signals. Thus, as used herein, the terms "device" and "mobile device" may be used interchangeably as each term is intended to refer to any single device or any combinable group of devices that may transmit and/or receive wireless signals.

In various embodiments, the device 102 may include a mobile device such as a cellular phone, a smart phone, a personal digital assistant, a portable computing device, a navigation device, a tablet, and/or the like or any combination thereof. In other embodiments, the device 102 may take the form of a machine that is mobile or stationary. In yet other embodiments, the device 102 may take the form of one or more integrated circuits, circuit boards, and/or the like that may be operatively enabled for use in another device.

The device 102 may include at least one radio (also referred to as a transceiver). The terms "radio" or "transceiver" as used herein refers to any circuitry and/or the like that may be enabled to receive wireless signals and/or transmit wireless signals. In particular embodiments, two or more radios may be enabled to share a portion of circuitry and/or the like (e.g., a processing unit, memory, etc.). That is the terms "radio" or "transceiver" may be interpreted to include devices that have the capability to both transmit and receive signals, including devices having separate transmitters and receivers, devices having combined circuitry for transmitting and receiving signals, and/or the like.

In some embodiments, the device 102 may include a first radio enabled to receive and/or transmit wireless signals associated with at least a first network of a wireless system 104 and a second radio that is enabled to receive and/or transmit wireless signals associated with at least a second network of the wireless system 104 and/or at least one navigation system 106 (e.g., a satellite positioning system and/or the like).

The wireless system 104 may, for example, be representative of any wireless communication system or network that may be enabled to receive and/or transmit wireless signals. By way of example but not limitation, the wireless system 104 may include one or more of a wireless wide area network (WWAN), a wireless local area network (WLAN), a wireless personal area network (WPAN), a wireless metropolitan area network (WMAN), a Bluetooth communication system, WiFi communication system, Global System for Mobile communication (GSM) system, Evolution Data Only/Evolution Data Optimized (EVDO) communication system, Ultra Mobile Broadband (UMB) communication system, Long Term Evolution (LTE) communication system, Mobile Satellite Service-Ancillary Terrestrial Component (MSS-ATC) communication system, and/or the like.

The wireless system 104 may be enabled to communicate with and/or otherwise operatively access other devices and/or resources as represented simply by cloud 110. For example, the cloud 110 may include one or more communication devices, systems, networks, or services, and/or one or more computing devices, systems, networks, or services, and/or the like or any combination thereof.

The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and/or the like. A CDMA network may implement one or more radio access technologies (RATs) such as cdma2000, Wideband CDMA (W-CDMA), to name just a few radio technologies. Here, cdma2000 may include technologies implemented according to IS-95, IS-2000, and IS-S56 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include (but not limited to) a Bluetooth network, an IEEE 802.15x, for example.

Figure 2:
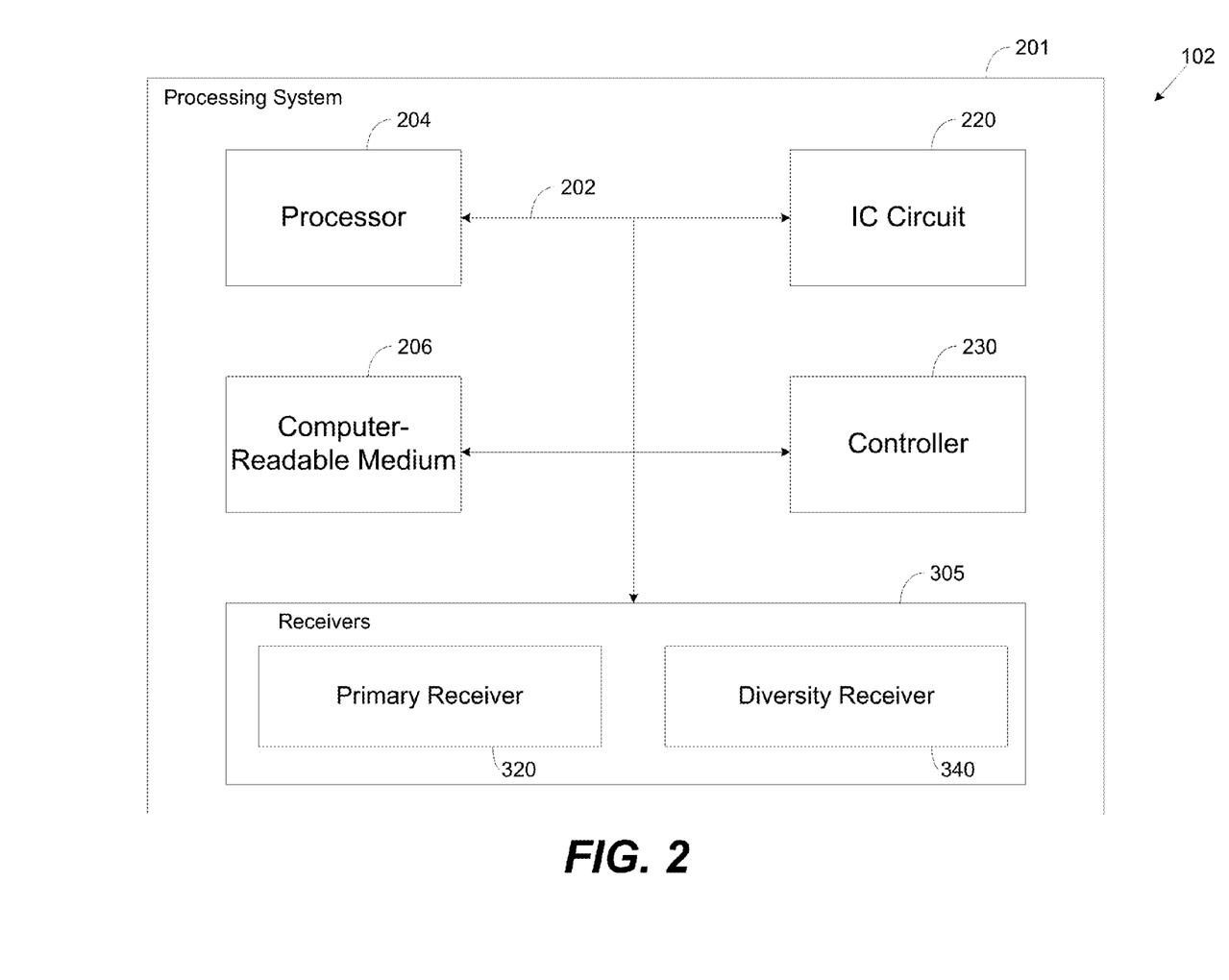
FIG. 2 is a block diagram of an illustrative hardware configuration for an apparatus employing a processing system according to various embodiments of the disclosure.

FIG. 2 is a block diagram of an illustrative hardware configuration for an apparatus, such as the device 102, employing a processing system 201 according to various embodiments of the disclosure, including (but not limited to) the embodiments of FIGS. 1 and 3-4B. In this example, the processing system 201 may be implemented with a bus architecture represented generally by bus 202. The bus 202 may include any number of interconnecting buses and bridges depending on the specific application of the processing system 201 and the overall design constraints. The bus 202 links together various circuits including one or more processors, represented generally by the processor 204, and computer-readable media, represented generally by the computer-readable medium 206. The bus 202 may also link various other circuits such as timing sources, peripherals, voltage regulators, and power management circuits, which are well known in the art, and therefore, will not be described any further. A bus interface 208 provides an interface between the bus 202 and a plurality of transceivers 210 (also referred to as radios). Each of the transceivers 210 allows for communicating with various other apparatus over a transmission medium.

A processor 204 is responsible for managing the bus 202 and general processing, including the execution of software stored on computer-readable storage medium 206. The software, when executed by the processor 204, causes the processing system 201 to perform the various functions described in the disclosure for any particular apparatus. The computer readable storage medium 206 may also be used for storing data that is manipulated by the processor 204 when executing software.

In various embodiments, the processing system 201 includes an interference cancellation (IC) circuit 220 (also referred to as an active interference cancellation (AIC) circuit) and a controller 230. The IC circuit 220 is configured to cancel interference produced by the transceivers 210 that are operating on the same, adjacent, or harmonic/sub-harmonic frequencies. The controller 230 may be a microcontroller, a microprocessor, computer, state machine, or other programmable device. The controller 230 is coupled to the IC circuit 220. The controller 230 executes one or more algorithms and/or include control logic (e.g., as stored on the computer-readable storage medium 206) for optimizing the reduction of interference by the IC circuit 220. In particular, the controller 230 adjusts the settings of the IC circuit 220 to adjust the amplitude, phase, and/or delay of an input signal to generate an output. In some embodiments, the controller may be the processor 204. The processing system 201 may include a receiver 305 having a primary receiver (e.g., part of primary receiver chain 320) and a diversity receiver (e.g., part of diversity receiver chain).

Figure 3A:
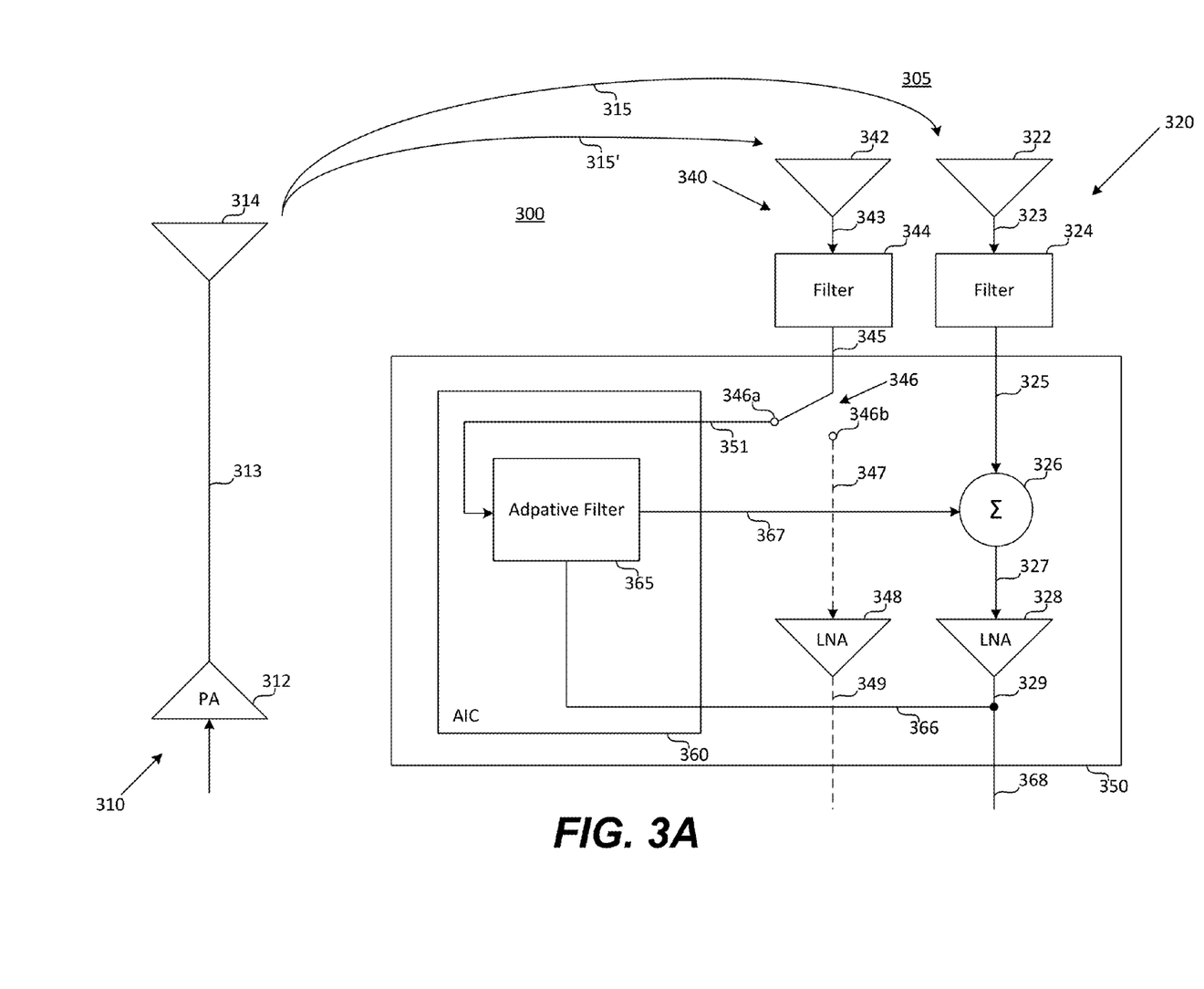
FIGS. 3A-3B is a diagram of a communication system according to various embodiments of the disclosure.
Figure 3B:
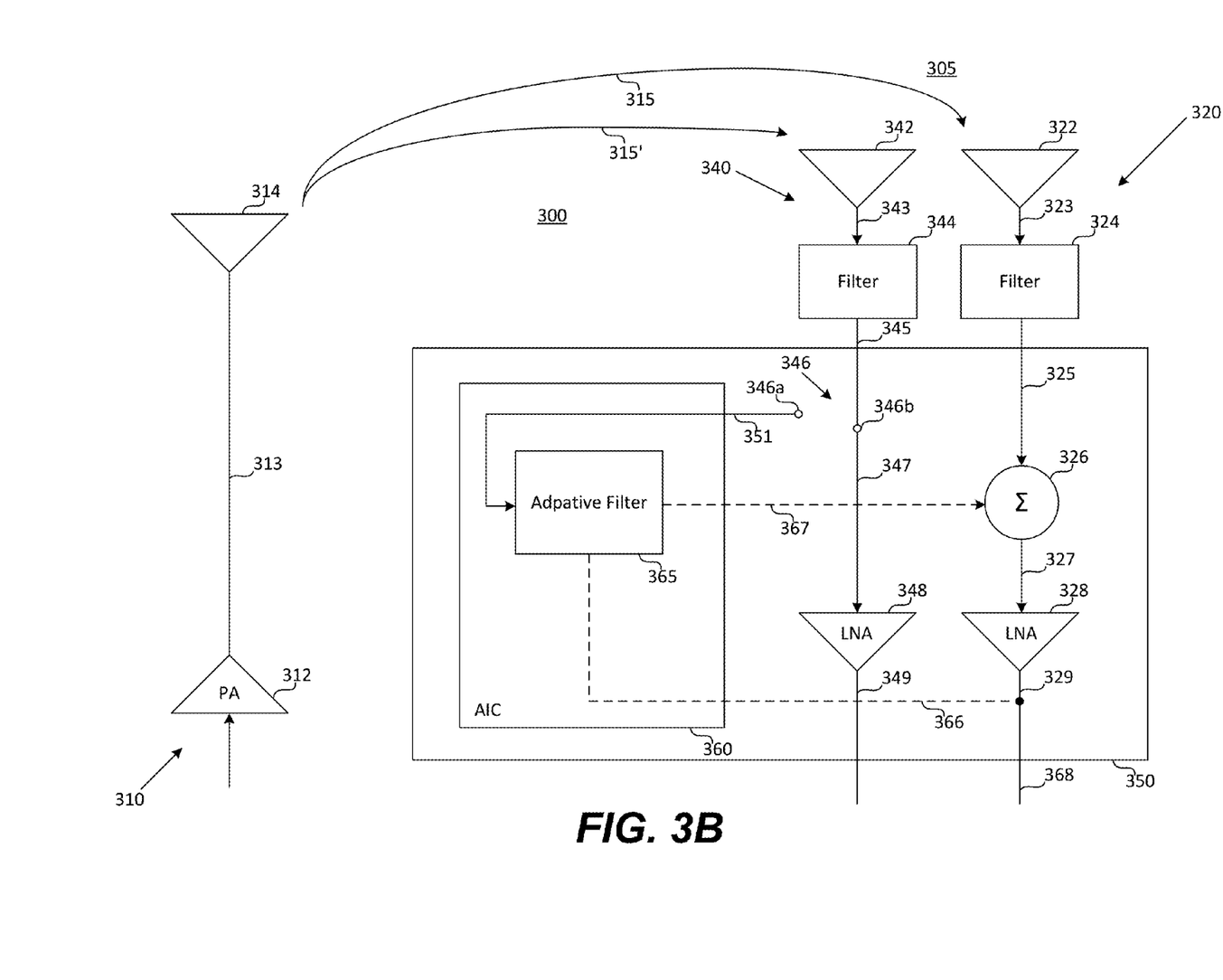

FIGS. 3A-3B are functional block diagrams of a communication system 300 employed with the device 102 (e.g., FIGS. 1-2) and/or the processing system 201 and may implement the features and methods of such. The communication system 300 may include a receiver 305 that includes a primary receiver chain 320 and a diversity receiver chain 340.

The communication system 300 also includes an interference cancellation (IC) circuit 360. Accordingly, the communication system 300 is configured to selectively operate in at least a first mode (e.g., FIG. 3A) and a second mode (e.g., FIG. 3B). In particular, the diversity receiver chain 340 can be selectively used in an IC path or a diversity path. In the first mode of operation, the diversity receiver chain 340 is switched to the IC path to allow the IC circuit 360 to perform interference cancellation. In the second mode of operation, the diversity chain 340 is used as the diversity path. Thus, in the second mode of operation, interference cancellation via the IC circuit 360 is not performed.

A transmitter 310 is electrically coupled to an antenna 314. The transmitter 310 transmits communication signals along a transmit path 313 to the antenna 314 to provide transmit a signal (also referred to as coupling channel) 315, 315'. In some embodiments, a power amplifier (PA) 312 for amplifying signals transmitted by the transmitter 310 may also be provided. In some embodiments, the transmitter 310 belongs to the same device as the communication system 300 (e.g., a same mobile device). In other embodiments, the transmitter 310 is part of a different device (e.g., a different mobile device) than the communication system 300. Thus, unlike conventional IC techniques, which are applicable only to in-device self-interference, such embodiments allow cancelling interference from a transmitter in either the same or different device.

The primary receiver chain 320 may include a primary receiver antenna 322 for receiving a first signal 315 that may be provided to a primary filter 324. A filtered signal 325 from the primary filter 324 may be provided to a summer 326. The diversity receiver chain 340 may include a diversity receiver antenna 342 for receiving a second signal 343 that may be provided to a diversity filter 344. One or more of the primary filter 324 and the diversity filter 344 may be a band pass filter (BPF), duplexer, notch filter, and/or the like. In particular embodiments, the primary filter 324 and the diversity filter 344 are identical filters (e.g., similar filtering characteristics) to minimize group delay.

Figure 4A:
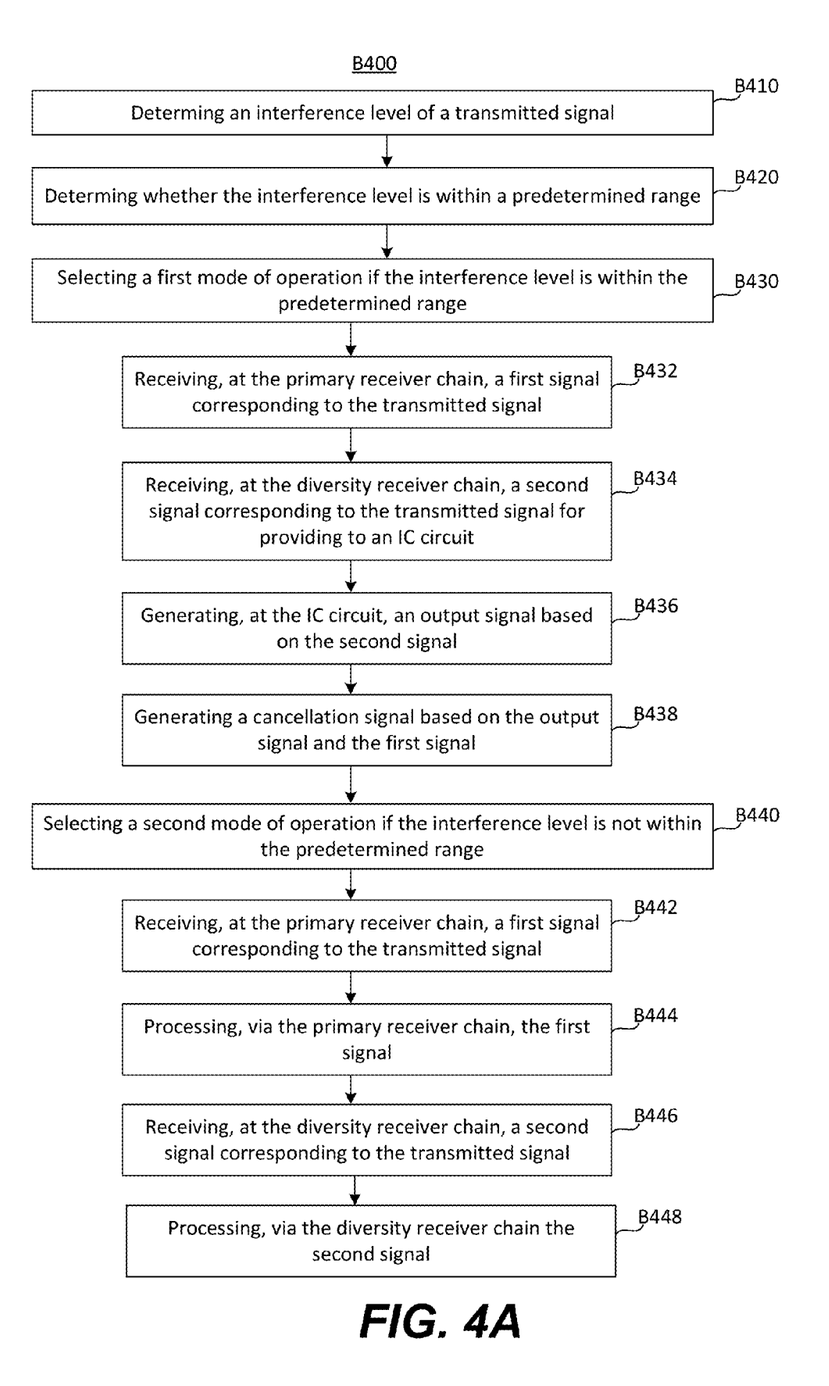
FIG. 4A is a flow chart of a method according to various embodiments of the disclosure.

FIG. 4A illustrates a method B400 of interference management, for example for reduction or cancellation of such interference, according to various embodiments of the disclosure. With reference to FIGS. 1-4A, the method B400 may be performed, for example, by the communication system 300 or the like (e.g., the IC circuit 220, the controller 230, etc.).

In various embodiments, at block B410, an interference level of a transmitted signal (e.g., 315) is determined. The interference level may correspond (but is not limited) to a signal-to-interference (SIR) level, interference-to-noise (INR) level, and/or the like. The interference level can be measured by measuring received signal strength indication (RSSI) of the receiver band when a desired signal is not being transmitted. When the desired signal is being transmitted, the transmitter's PA (e.g., 312) output power can be used to estimate the interference level. For instance, the interference level is the transmitter's PA output power minus antenna coupling loss minus filter or harmonic loss if the receiver band is different from transmitter band. In particular embodiments, a sensor may be provided for sensing, measuring, or otherwise detecting interference, such as an intensity or magnitude (level) of the interference, on a transceiver (e.g., receiver) or a symptom of interference (e.g., de-sense level), such as a reduced receiving signal or the like (e.g., reduced receiving rate, increased noise, etc.) by the receiver. In some embodiments, transmission information (e.g., by a transmitter) may be sensed, measured, or otherwise detected. In particular embodiments, the interference level (e.g., de-sense level) is based on (i) a frequency separation between a transmit channel of the transmitter (e.g., 310) and receive channel of the receiver and (ii) transit power of the transmitter.

In particular embodiments, the interference level of a transmitted signal is determined in response to detecting (e.g., by the controller 230 or other component) a co-existence issue between the receiver 305 (e.g., the primary receiver chain 320 or the diversity receiver chain 340) and a transmitter (e.g., 310). The controller 230, for instance, may detect a co-existence issue when at least a transmitter (aggressor transmitter) and the receiver 305 (victim receiver) is active (e.g., transmitting/receiving) at once. In particular embodiments, a co-existence issue may be detected when the transmitter and the receiver 305 are candidates for co-existence issues (e.g., as provided in a pre-defined look-up table or database). For instance, a co-existence issue may be detected between a transmitter 310 and the receiver 305. In some embodiments, the candidates may be provided in a look-up table or other database of known transceiver combinations that cause co-existence issues. Accordingly, when a combination of active transceivers is detected that appears in the table or database, a co-existence issue may be detected. In other embodiments, when interference or other symptom of interference is detected a co-existence issue may be detected.

In some embodiments, parameters of the detected co-existence issue may also be determined, for example, by the controller 230. For instance, the controller 230 may determine the parameters, such as the coupling channel gains, the frequency (e.g., f1), delay (e.g., d1), and/or the like of the aggressor transmitter.

At block B420, the method B400 includes determining whether the interference level is within a predetermined range. For instance, if the interference level is 40 dB higher than the receiver sensitivity, the receiver may determine that the interference is in the predetermined range. The range is within the receiver's dynamic range after the cancellation. For instance, if the receiver sensitivity is −100 dBm and the receiver dynamic range is 60 dB, the predetermined range is from −80 dBm to −20 dBm (assuming the system provides 20 dB of cancellation). In various embodiments, the predetermined range for the interference level is based on the co-existence issue. For instance, for a first co-existence issue, which is between a first transmitter (e.g., 310) and the receiver 305, a first predetermined range is used. For a second co-existence issue, which is between a second transmitter (not shown) and the receiver 305, a second predetermined range is used (which may be different from the first predetermined range).

At block B430, a first mode of operation is selected if the interference level is within the predetermined range. In the first mode, at block B432, the primary receiver chain 320 receives, via the primary antenna 322, a first signal 315 that corresponds to the signal 313. The primary antenna 322 provides corresponding signal 323 to the primary filter 324 to provide the filtered signal 325. At block B434, the diversity receiver chain 340 receives, via the diversity antenna 342, a second signal 315' that corresponds to the signal 313. The diversity antenna 342 provides corresponding signal 343 to the diversity filter 344 to provide filtered signal 345.

Figure 3C:
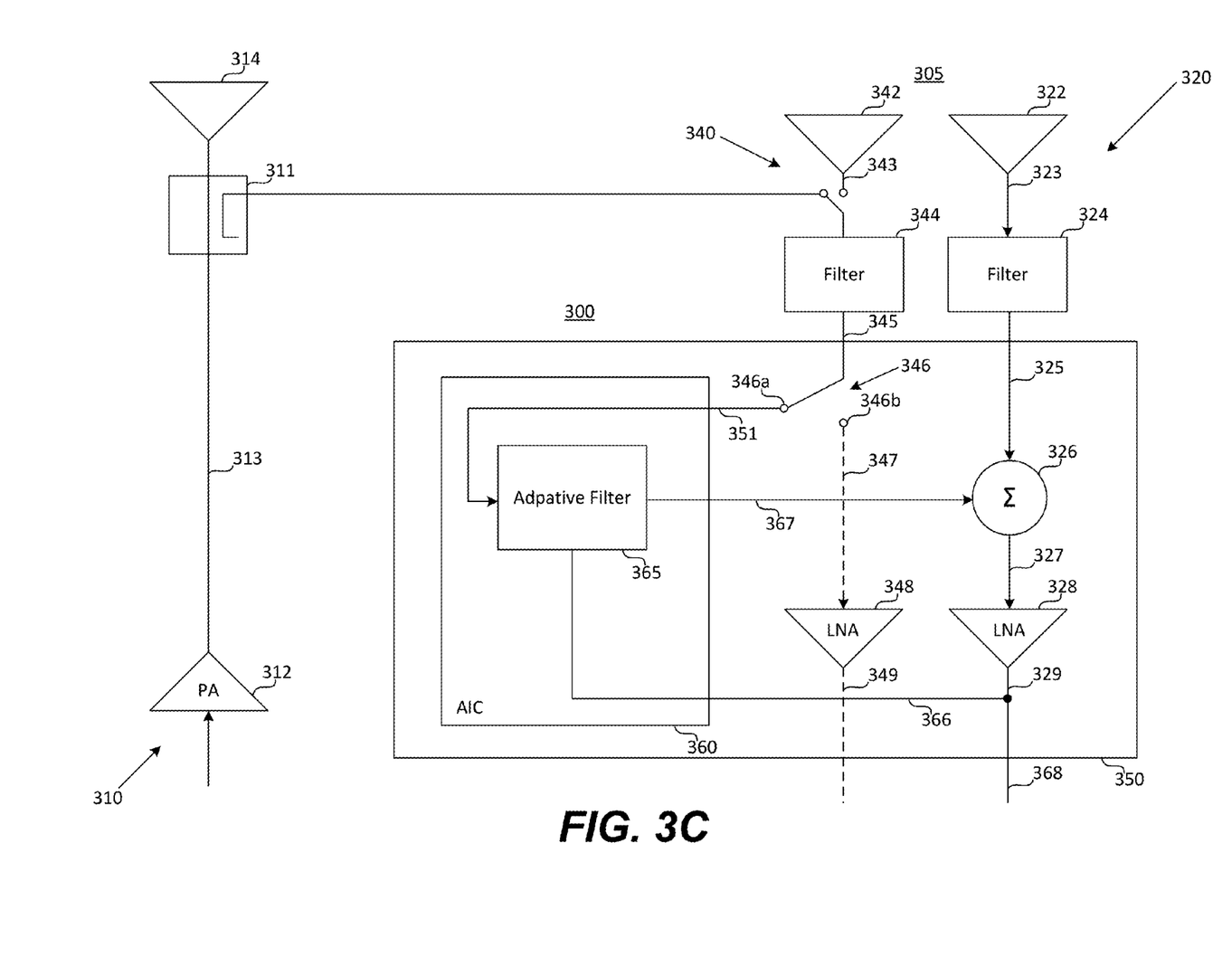
FIG. 3C is a diagram of a communication system according to various embodiments of the disclosure.

At block B436, the IC circuit 360 generates an output signal (compensation signal) based on the second signal 315'. For instance, the filtered signal 345 in the diversity chain 340 may be switched to an IC path 351. For example, a switch 346 may be operated to provide the filtered signal 345 to an IC path node 346a. Accordingly, the filtered signal 345 is provided to the IC circuit 360. In other embodiments, a signal may be provided to the IC path 351, for example, via a coupler 311 after the PA 312 of the transmitter 310 (e.g., refer to FIG. 3C).

The IC circuit 360 is configured to adjust the amplitude, phase, and/or delay of a sample signal (filtered signal 345) to produce an output signal 367 that, when combined with the filtered signal 325 of the primary receiver chain 320 at the summer 326 (to provide cancellation signal 327), reduces, suppresses, or cancels the amplitude of in-band and/or nearby out-of-band interference and/or noise introduced onto the primary receiver chain 320 (block 438). In particular, the cancellation signal 327 may be provided to a low noise amplifier (LNA) 328. The adaptive filter 365 may receive a sample 366 (corresponding to signal 329) from the LNA 328 to provide parameters (coefficients) to adjust the IC circuit 360.

In some embodiments, the IC circuit 360 comprises a single-tap least-mean square (LMS) adaptive filter 365. The LMS adaptive filter 365 may receive an input signal (filtered signal 345) and generate the output signal 367. It should be noted that in other embodiments, an LMS filter having any number of taps (e.g., three taps) may be implemented. In some embodiments, the LMS adaptive filter 365 implements analog methods. Analog methods, for example, allow for wideband interference cancellation. In other embodiments, the LMS adaptive filter 365 implements digital methods. Digital methods, for example, may provide a good tradeoff between main lobe and side lobe cancellation.

According to various embodiments, because the reference (input) signal (e.g., the second signal 315') is applied to the IC circuit 360 via the diversity receiver chain 340, there is no need for a wired reference signal from the transmitter 310 to the IC circuit 360. As such, in such embodiments, there is no degradation of the transmitted signal. Moreover, in such embodiments, no direction coupler is needed on the transmit path (e.g., 313).

Alternatively, at block B440, a second mode of operation is selected if the interference level is not within the predetermined range. In the second mode of operation, IC is not performed and the diversity chain 340 is used as a diversity path for diversity processing. In particular, in the second mode, at block B442, the primary receiver chain 320 receives, via the primary antenna 322, a first signal 315 that corresponds to the signal 313. The primary antenna 322 provides corresponding signal 323 to the primary filter 324 to provide the filtered signal 325. Accordingly, at block B444, the primary receiver chain 420 processes the filtered signal 425 (without applying any IC techniques via the IC circuit 360).

At block B446, the diversity receiver chain 340 receives, via the diversity antenna 342, a second signal 315' that corresponds to the signal 313. The diversity antenna 342 provides corresponding signal 343 to the diversity filter 344 to provide the filtered signal 345. Accordingly, at block B448, the diversity receiver chain 440 processes the filtered signal 445. For instance, the filtered signal 345 in the diversity chain 305 is switched to a diversity path 347. For instance, the switch 346 may be operated to provide the filtered signal 345 to a diversity path node 346b. The signals processed in the primary receiver chain 320 and the diversity receiver chain 340 allow for diversity management and the like.

In some embodiments, the processing system 201 may selectively ignore or otherwise not manage a particular co-existence issue (e.g., via the IC circuit 220 and/or the controller 230) under certain circumstances. For example, the processing system 201 may selectively ignore or otherwise not manage the particular co-existence issue if the processing system 201 (e.g., the controller 230) determines that the particular co-existence issue is being managed by a different method and/or system. For instance, if the co-existence issue is managed by a baseband IC circuitry, the processing system 201 may not manage the issue with an analog IC circuitry. As another example, the processing system 201 may selectively ignore or otherwise not manage the particular co-existence issue if the processing system 201 (e.g., the controller 230) determines that the particular co-existence issue is below (or exceeds) a specified threshold (or range). For instance, the particular co-existence issue may be ignored if the issue causes light interference (e.g., a few decibels). That is, the co-existence issue may be ignored (or otherwise unmanaged) if an intensity of the interference is below (or exceeds) a predetermined threshold or range. For example, if the interference is less than 10 dB above a sensitivity level of the receiver, the co-existence issue may be ignored.

In some embodiments, a receiver chain may be selected from the receiver chains 320, 340 based on the interference level. For instance, the receiver chain 320 may be selected as the primary receiver chain and the receiver chain 340 may be selected as the diversity receiver chain if the receiver chain 320 has a higher SINR than that of the receiver chain 340. Accordingly, in such embodiments, signals received via the receiver chain 340 may be selectively provided to the IC circuit 360.

Figure 4B:
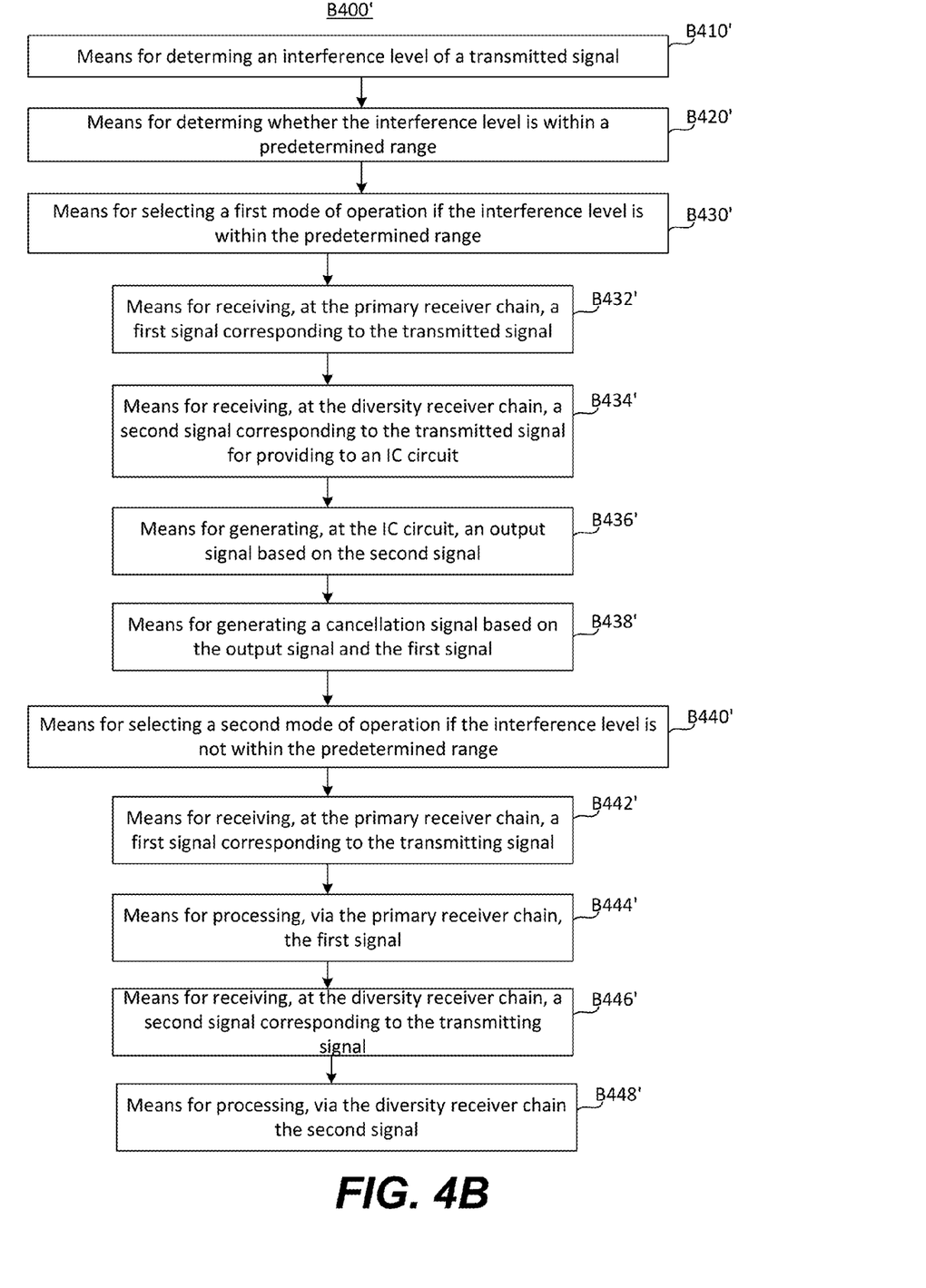
FIG. 4B is a diagram of an apparatus according to various embodiments of the disclosure.
Figure 5:
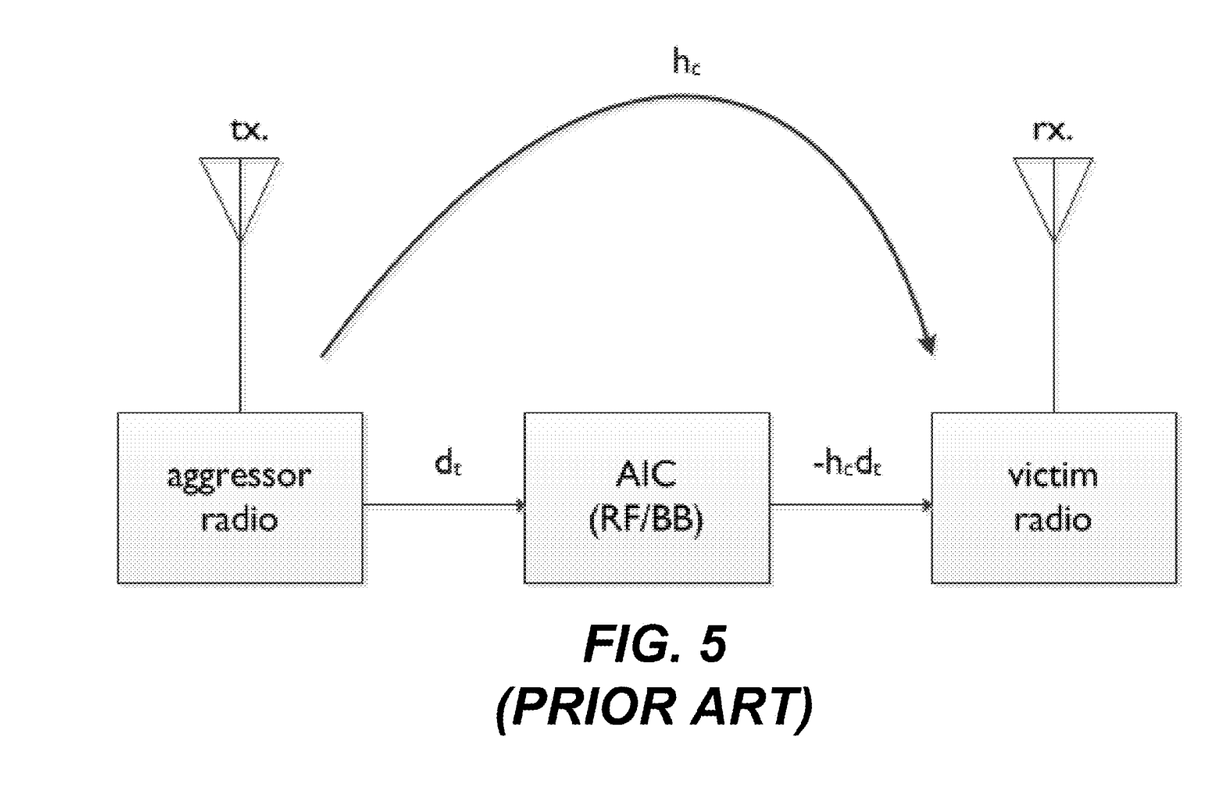
FIG. 5 is a block diagram of an active interference cancellation system.

The method B400 described in FIG. 4A above may be performed by various hardware and/or software component(s) and/or module(s) corresponding to the means-plus-function blocks B400' illustrated in FIG. 4B. In other words, blocks B410 through B458 illustrated in FIG. 4A correspond to means-plus-function blocks B410' through B458' illustrated in FIG. 4B.

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:
1. A method of performing interference cancellation (IC) in a wireless communication device having a receiver comprising at least a primary receiver chain and a diversity receiver chain, the method comprising:
   determining an interference level of a transmitted signal on the receiver;

determining whether the interference level is within a predetermined range;
selecting a first mode of operation if the interference level is within a predetermined range; and
selecting a second mode of operation if the interference level is not within the predetermined range;
wherein the first mode comprises:
  receiving, at the primary receiver chain, a first signal corresponding to the transmitted signal;
  receiving, at the diversity receiver chain, a second signal corresponding to the transmitted signal for providing to an IC circuit;
  generating, at the IC circuit, an output signal based on the second signal; and
  generating a cancellation signal based on the output signal and the first signal;
wherein the second mode comprises:
  receiving, at the primary receiver chain, a first signal corresponding to the transmitted signal;
  processing, via the primary receiver chain, the first signal;
  receiving, at the diversity receiver chain, a second signal corresponding to the transmitted signal; and
  processing, via the diversity receiver chain, the second signal.

2. The method of claim 1, wherein a cancellation signal is not generated in the second mode.

3. The method of claim 1, wherein the transmitted signal is transmitted from a transmitter of a different wireless communication device.

4. The method of claim 1, wherein the transmitted signal is transmitted from a transmitter of the wireless communication device.

5. The method of claim 1, wherein the interference level comprises at least one of a signal-to-interference (SIR) level and an interference-to-noise (INR) level.

6. A method of performing interference cancellation (IC) in a wireless communication device having a receiver comprising at least a primary receiver chain and a diversity receiver chain, the method comprising:
  detecting a co-existence issue between a transmitter transmitting the transmitted signal and the receiver; and
  upon detection of the co-existence issue, determining an interference level of a transmitted signal on the receiver;
  determining whether the interference level is within a predetermined range; and
  selecting a second mode of operation if the interference level is not within the predetermined range;
wherein the first mode comprises:
  receiving, at the primary receiver chain, a first signal corresponding to the transmitted signal;
  receiving, at the diversity receiver chain, a second signal corresponding to the transmitted signal for providing to an IC circuit;
  generating, at the IC circuit, an output signal based on the second signal; and
  generating a cancellation signal based on the output signal and the first signal;
wherein the second mode comprises:
  receiving, at the primary receiver chain, a first signal corresponding to the transmitted signal;
  processing, via the primary receiver chain, the first signal;
  receiving, at the diversity receiver chain, a second signal corresponding to the transmitted signal; and
  processing, via the diversity receiver chain, the second signal.

7. The method of claim 6,
  wherein a first co-existence issue corresponds to a first predetermined range; and
  wherein a second co-existence issue corresponds to a second predetermined range.

8. The method of claim 6, wherein the predetermined range is based on the co-existence issue.

9. The method of claim 6, wherein the detecting a co-existence issue comprises comparing the interference level with a pre-defined table.

10. The method of claim 6, wherein
  determining an interference level of a transmitted signal on the receiver is not performed if the co-existence issue is not detected;
  determining whether the interference level is within a predetermined range is not performed if the co-existence issue is not detected;
  selecting a first mode of operation if the interference level is within a predetermined range is not performed if the co-existence issue is not detected; and
  selecting a second mode of operation if the interference level is not within the predetermined range is not performed if the co-existence issue is not detected.

11. The method of claim 1, wherein the IC circuit comprises an adaptive filter.

12. The method of claim 11, wherein the adaptive filter comprises a least mean squares (LMS) adaptive filter.

13. The method of claim 12, wherein the LMS adaptive filter comprises at least one of an analog-controlled analog LMS adaptive filter and a digitally-controlled analog LMS adaptive filter.

14. The method of claim 1, wherein the primary receiver chain comprises a primary filter and the diversity receiver chain comprises a diversity filter.

15. The method of claim 14, wherein the primary filter and the diversity filter have identical filtering characteristics.

16. The method of claim 14, wherein each of the primary filter and the diversity filter comprises at least one of a band pass filter, a duplexer, and a notch filter.

17. An apparatus for performing interference cancellation (IC) in a wireless communication device having a receiver comprising at least a primary receiver chain and a diversity receiver chain, the apparatus comprising:
  a processor configured to determine an interference level of a transmitted signal on the receiver, the processor configured to determine whether the interference level is within a predetermined range, the processor configured to select a first mode of operation if the interference level is within a predetermined range, and the processor configured to select a second mode of operation if the interference level is not within the predetermined range; and
  an IC circuit, wherein in the first mode of the operation,
    the IC circuit is configured to generate an output signal based on a second signal received at the diversity receiver chain, the second signal corresponding to the transmitted signal; and
    the IC circuit is configured to generate a cancellation signal based on the output signal and a first signal received at the primary receiver chain, the first signal corresponding to the transmitted signal.

18. A method of performing interference cancellation (IC) in a wireless communication device having a receiver comprising at least a primary receiver chain and a diversity receiver chain, the method comprising:
  determining an interference level of a transmitted signal on the receiver;

determining whether the interference level is within a predetermined range;
selecting one of the primary receiver chain and the diversity receiver chain based on the interference level of each;
selecting a first mode of operation if the interference level is within a predetermined range; and
selecting a second mode of operation if the interference level is not within the predetermined range;
wherein the first mode comprises:
receiving, at the selected receiver chain, a first signal corresponding to the transmitted signal;
receiving, at the other receiver chain, a second signal corresponding to the transmitted signal for providing to an IC circuit;
generating, at the IC circuit, an output signal based on the second signal; and
generating a cancellation signal based on the output signal and the first signal;
wherein the second mode comprises:
receiving, at the selected receiver chain, a first signal corresponding to the transmitted signal;
processing, via the selected receiver chain, the first signal;
receiving, at the other receiver chain, a second signal corresponding to the transmitted signal; and
processing, via the other receiver chain, the second signal.

19. The method of claim 18, wherein the primary receiver chain is selected if the interference level on the primary receiver chain is greater than the interference level on the diversity receiver chain.

20. The method of claim 18, wherein the diversity receiver chain is selected if the interference level on the diversity receiver chain is greater than the interference level on the primary receiver chain.

21. An article comprising a non-transient computer readable medium having computer code therein that is implementable by a processor in a wireless communication device to:
determine an interference level of a transmitted signal on a receiver having at least a primary receiver chain and a diversity receiver chain;
determine whether the interference level is within a predetermined range;
select a first mode of operation if the interference level is within a predetermined range; and
select a second mode of operation if the interference level is not within the predetermined range;
wherein, in the first mode of operation, the computer code is implementable by the processor to:
receive, at the primary receiver chain, a first signal corresponding to the transmitted signal;
receive, at the diversity receiver chain, a second signal corresponding to the transmitted signal for providing to an IC circuit;
generate, at the IC circuit, an output signal based on the second signal; and
generate a cancellation signal based on the output signal and the first signal;
wherein the second mode comprises:
receive, at the primary receiver chain, a first signal corresponding to the transmitted signal;
process, via the primary receiver chain, the first signal;
receive, at the diversity receiver chain, a second signal corresponding to the transmitted signal; and
process, via the diversity receiver chain, the second signal.

22. An apparatus for performing interference cancellation (IC) in a wireless communication device having a receiver comprising at least a primary receiver chain and a diversity receiver chain, the apparatus comprising:
determining means for determining an interference level of a transmitted signal on the receiver;
determining means for determining whether the interference level is within a predetermined range;
selecting means for selecting a first mode of operation if the interference level is within a predetermined range; and
selecting means for selecting a second mode of operation if the interference level is not within the predetermined range;
wherein the first mode comprises:
receiver means for receiving, at the primary receiver chain, a first signal corresponding to the transmitted signal;
receiver means for receiving, at the diversity receiver chain, a second signal corresponding to the transmitted signal for providing to an IC circuit;
generating means for generating, at the IC circuit, an output signal based on the second signal; and
generating means for generating a cancellation signal based on the output signal and the first signal;
wherein the second mode comprises:
receiver means for receiving, at the primary receiver chain, a first signal corresponding to the transmitted signal;
processor means for processing, via the primary receiver chain, the first signal;
receiver means for receiving, at the diversity receiver chain, a second signal corresponding to the transmitted signal; and
processor means for processing, via the diversity receiver chain, the second signal.

23. The method of claim 1, wherein each of the first mode of operation and the second mode of operation is a mode of operation for the primary receiver chain and the diversity receiver chain.

* * * * *